United States Patent
Masy et al.

(10) Patent No.: US 12,024,587 B2
(45) Date of Patent: Jul. 2, 2024

(54) CONTINUOUS PROCESS FOR MAKING POLYETHER POLYOLS

(71) Applicant: Dow Global Technologies LLC, Midland, MI (US)

(72) Inventors: Jean-Paul Masy, Destelbergen (BE); David A. Babb, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 1130 days.

(21) Appl. No.: 16/642,436

(22) PCT Filed: Aug. 21, 2018

(86) PCT No.: PCT/US2018/047252
§ 371 (c)(1),
(2) Date: Feb. 27, 2020

(87) PCT Pub. No.: WO2019/055177
PCT Pub. Date: Mar. 21, 2019

(65) Prior Publication Data
US 2020/0255592 A1  Aug. 13, 2020

Related U.S. Application Data

(60) Provisional application No. 62/559,109, filed on Sep. 15, 2017.

(51) Int. Cl.
| | |
|---|---|
| *C08G 65/12* | (2006.01) |
| *C08G 18/16* | (2006.01) |
| *C08G 18/18* | (2006.01) |
| *C08G 18/20* | (2006.01) |
| *C08G 18/24* | (2006.01) |
| *C08G 18/48* | (2006.01) |
| *C08G 18/76* | (2006.01) |
| *C08G 65/02* | (2006.01) |
| *C08G 65/26* | (2006.01) |

(52) U.S. Cl.
CPC ........... *C08G 65/12* (2013.01); *C08G 18/165* (2013.01); *C08G 18/1833* (2013.01); *C08G 18/2063* (2013.01); *C08G 18/244* (2013.01); *C08G 18/4816* (2013.01); *C08G 18/4829* (2013.01); *C08G 18/4837* (2013.01); *C08G 18/7664* (2013.01); *C08G 65/02* (2013.01); *C08G 65/26* (2013.01); *C08G 65/2663* (2013.01); *C08G 65/269* (2013.01); *C08G 65/2696* (2013.01); *C08G 2110/0016* (2021.01); *C08G 2110/0058* (2021.01); *C08G 2110/0083* (2021.01)

(58) Field of Classification Search
CPC ... B01J 37/04; B01J 23/80; B01J 27/26; B01J 35/1009; B01J 37/036; B01J 37/06; B01J 37/08; C07F 15/065; C08G 65/2663; C08G 65/269; C08G 65/2693; C08G 2220/00; C08G 65/12; C08G 65/02; C08G 65/26; C08G 65/2696; C08G 2110/0016; C08G 2110/0058; C08G 2110/0083; C08G 18/165; C08G 18/1833; C08G 18/2063; C08G 18/244; C08G 18/4816; C08G 18/4829; C08G 18/4837; C08G 18/7664

See application file for complete search history.

(56) References Cited

U.S. PATENT DOCUMENTS

| | | |
|---|---|---|
| 6,642,423 B2 | 11/2003 | Clement |
| 7,528,288 B2 | 5/2009 | Ostrowski |
| 2005/0014979 A1 | 1/2005 | Eleveld |
| 2011/0230581 A1 | 9/2011 | Klescewski |
| 2017/0158804 A1 | 6/2017 | Hofmann |

FOREIGN PATENT DOCUMENTS

| | | |
|---|---|---|
| EP | 1927612 A | 6/2008 |
| EP | 2223953 A | 9/2010 |
| EP | 2208747 B | 10/2015 |
| WO | 2011/075333 A | 6/2011 |
| WO | 2016/209677 A | 12/2016 |

*Primary Examiner* — Rabon A Sergent

(57) ABSTRACT

An alkylene oxide mixture containing greater than 50% by weight ethylene oxide is continuously polymerized in the presence of a double metal cyanide polymerization catalyst and an alkoxylated initiator having a hydroxyl equivalent weight of up to 200. The catalyst remains active, producing a polyol having an equivalent weight of up to 700 with a high oxyethylene content continuously at fast reaction rates.

13 Claims, No Drawings

CONTINUOUS PROCESS FOR MAKING POLYETHER POLYOLS

This invention relates to a process for continuously copolymerizing an alkylene oxide mixture containing predominantly ethylene oxide in the presence of a double metal cyanide (DMC) polymerization catalyst.

DMC complexes are effective catalysts for polymerizing propylene oxide to form poly(propylene oxide) polyols. The poly(propylene oxide) polyols are useful as a raw material for making polyurethanes.

Mixtures of propylene oxide and ethylene oxide have also been polymerized using DMC catalysts. In general, these mixtures have contained mostly propylene oxide and a minor amount of ethylene oxide. In some cases, DMC catalysts have been described for polymerizing mixtures containing predominantly ethylene oxide. However, these polymerizations have been mainly limited to end-capping a poly(propylene oxide) in an attempt to introduce primary hydroxyl groups. For example, U.S. Pat. No. 6,884,826 describes a process in which propylene oxide is polymerized using a DMC catalyst. As the polymerization proceeds, ethylene oxide is fed along with the propylene oxide, in gradually increasing proportions. During the last 15% or so of the polymerization, the ethylene oxide concentration in the monomer mixture being fed to the reaction increases above 50% by weight.

The process of U.S. Pat. No. 6,884,826 has significant shortcomings. It is inherently a batch or semi-batch process, and is not adaptable to continuous polyol production. Additionally, although the DMC catalyst remains active for the relatively short periods during which ethylene oxide is the predominant monomer present, it nonetheless deactivates after only a short time, particularly when product equivalent weight is low. This again restricts the process of U.S. Pat. No. 6,884,826 to batch or semi-batch operation.

A random copolymer of predominantly ethylene oxide and a minor amount of propylene oxide is useful in some polyurethane applications. These polyols have found use as, for example, for making viscoelastic foam. They are also useful as cell openers in flexible polyurethane foam. These polyols can be made in batch or semi-batch processes using potassium hydroxide or other basic catalysts, but no commercially acceptable method has been found for making these polyols using a DMC catalyst, because of the problem of catalyst deactivation in the presence of high concentrations of ethylene oxide in the monomer feed. Because of the potential advantages DMC catalysis offers, it would be desirable to provide a continuous process for making these random copolymers.

WO 2016/209677 describes a continuous process for making such random copolymers using a DMC catalyst. A promoter compound is required to prevent deactivation of the catalyst.

This invention is a continuous process for producing a polyether product having a hydroxyl equivalent weight of 200 to 2000, comprising:

a) forming in a continuous reactor a mixture of A) a double metal cyanide catalyst, B) an alkylene oxide mixture containing propylene oxide and at least 60% by weight ethylene oxide based on the weight of the alkylene oxide, C) at least one alkoxylated initiator compound having at least one hydroxyl group and a hydroxyl equivalent weight of 70 to 200 but lower than that of the polyether product, and D) a polymerizate consisting of alkoxylated species having molecular weights greater than the initiator compound and up to and including molecular weight of the polyether product, and b) continuously adding additional catalyst, additional alkylene oxide mixture containing propylene oxide and at least 60% by weight ethylene oxide based on the weight of the alkylene oxide, and additional initiator compound to the continuous reactor under polymerization conditions and continuously withdrawing a product stream containing the polyether product from the continuous reactor, wherein:

i) steps a) and b) are performed in the substantial absence of a magnesium, Group 3-Group 15 metal or lanthanide series metal bonded to at least one alkoxide, aryloxy, carboxylate, acyl, pyrophosphate, phosphate, thiophosphate, dithiophosphate, phosphate ester, thiophosphate ester, amide, siloxide, hydride, carbamate or hydrocarbon anion and which is devoid of halide anions, and ii) the polyether product contains 50 to 90% by weight polymerized ethylene oxide.

Surprisingly, the process operates continuously at high polymerization rates and without deactivation, permitting sustained continuous operation despite the absence of the magnesium, Group 3-Group 15 or lanthanide series metal compound.

The alkylene oxide mixture polymerized in this invention contains greater than 60% by weight ethylene oxide, based on the weight of the oxide mixture. It may contain, for example, at least 70% or at least 75% by weight ethylene oxide, and may contain as much as 95%, as much as 90% or as much as 85% ethylene oxide, by weight in each case. The alkylene oxide mixture contains at most 40% by weight 1,2-propylene oxide. It may contain up to 30%, up to 25%, up to 15%, up to 10%, or up to 5% by weight 1,2-propylene oxide. The alkylene oxide mixture may contain a small amount, such as up to 25% by weight, up to 10% by weight or up to 5% by weight, of one or more other alkylene oxides, but such other alkylene oxides may be omitted.

The initiator compound is an alkoxylated organic compound that is to be further alkoxylated in the polymerization reaction. It contains 1 or more hydroxyl groups, preferably 2 or more hydroxyl groups. It may contain 12 or more hydroxyl groups. Preferred initiators contain 2 to 8 hydroxyl groups per molecule. Mixtures of initiator compounds can be used.

The initiator compound has a hydroxyl equivalent weight of 70 to 200 but lower than that of the polyether product. In some embodiments the hydroxyl equivalent weight is 70 to 150 or 70 to 125.

Suitable initiators include but are not limited to alkoxylates of one or more of ethylene glycol, diethylene glycol, triethylene glycol, propylene glycol, dipropylene glycol, tripropylene glycol, 1,4-butane diol, 1,6-hexane diol, 1,8-octane diol, cyclohexane dimethanol, glycerin, trimethylolpropane, trimethylolethane, pentaerythritol, sorbitol, sucrose, phenol, a $C_{1-24}$ alkanol, and a polyphenolic initiator such as bisphenol A or 1,1,1-tris(hydroxyphenyl)ethane and the like. The alkoxylate may be an ethoxylate and/or a propoxylate.

The initiator may be neutralized with or contain a small amount of an acid, particularly if the initiator is produced in the presence of a base. If an acid is present, it may be present in an amount of about 10 to 100 ppm, based on the weight of the initiator, as described in U.S. Pat. No. 6,077,978. Alternatively, the acid may be used in somewhat larger amounts, such as 100 to 1000 ppm, again based on the weight of the initiator, as described in US Published Patent Application No. 2005-0209438.

Suitable double metal cyanide (DMC) catalysts include those described, for example, in U.S. Pat. Nos. 3,278,457, 3,278,458, 3,278,459, 3,404,109, 3,427,256, 3,427,334, 3,427,335 and 5,470,813. Some suitable DMC catalysts can be represented by the formula $$M_b[M^1(CN)_r(X)_t]_c[M^2(X)_6]_d \cdot nM^3{}_xA_y$$

wherein M and $M^3$ are each metals; $M^1$ is a transition metal different from M, each X represents a group other than cyanide that coordinates with the $M^1$ ion; $M^2$ is a transition metal; A represents an anion; b, c and d are numbers that reflect an electrostatically neutral complex; r is from 4 to 6; t is from 0 to 2; x and y are integers that balance the charges in the metal salt $M^3{}_xA_y$, and n is zero or a positive integer. The foregoing formula does not reflect the presence of neutral complexing agents such as t-butanol which are often present in the DMC catalyst complex.

M and $M^3$ each are preferably a metal ion independently selected from the group consisting of $Zn^{2+}$, $Fe^{2+}$, $Co^{+2+}$, $Ni^{2+}$, $Mo^{4+}$, $Mo^{6+}$, $Al^{+3+}$, $V^{4+}$, $V^{5+}$, $Sr^{2+}$, $W^{4+}$, $W^{6+}$, $Mn^{2+}$, $Sn^{2+}$, $Sn^{4+}$, $Pb^{2+}$, $Cu^{2+}$, $La^{3+}$ and $Cr^{3+}$, with $Zn^{2+}$ being preferred.

$M^1$ and $M^2$ are preferably $Fe^{3+}$, $Fe^{2+}$, $Co^{3+}$, $Co^{2+}$, $Cr^{2+}$, $Cr^{3+}$, $Mn^{2+}$, $Mn^{3+}$, $Ir^{3+}$, $Ni^{2+}$, $Rh^{3+}$, $Ru^{2+}$, $V^{4+}$, $V^{5+}$, $Ni_{2+}$, $Pd^{2+}$, and $Pt^{2+}$. Among the foregoing, those in the plus-three oxidation state are more preferred as the $M^1$ and $M^2$ metal. $Co^{+3}$ and $Fe^{+3}$ are even more preferred and $Co^{+3}$ is most preferred.

Suitable anions A include but are not limited to halides such as chloride, bromide and iodide, nitrate, sulfate, carbonate, cyanide, oxalate, thiocyanate, isocyanate, perchlorate, isothiocyanate, an alkanesulfonate such as methanesulfonate, an arylenesulfonate such as p-toluenesulfonate, trifluoromethanesulfonate (triflate) and a $C_{1-4}$ carboxylate. Chloride ion is especially preferred.

r is preferably 4, 5 or 6, preferably 4 or 6, and most preferably 6; t is preferably 0 or 1, most preferably 0. In most cases, r+t will equal six.

A suitable type of DMC catalyst complex is a zinc hexacyanocobaltate catalyst complex as described, for example, in any of U.S. Pat. Nos. 3,278,457, 3,278,458, 3,278,459, 3,404,109, 3,427,256, 3,427,334, 3,427,335 and 5,470,813. An especially preferred type of DMC catalyst is complexed with t-butanol.

The concentration of DMC catalyst complex in step b) of the process may be 1 to 5000 ppm based on the weight of the reaction mixture. The concentration of DMC catalyst complex may be at least 2 ppm, at least 5 ppm, at least 10 ppm or at least 25 ppm, up to 500 ppm, up to 250 ppm, up to 150 ppm or up to 100 ppm. The withdrawn product stream will contain DMC catalyst residues within the same ranges.

Steps a) and b) are performed in the substantial absence of a magnesium, Group 3-Group 15 metal or lanthanide series metal bonded to at least one alkoxide, aryloxy, carboxylate, acyl, pyrophosphate, phosphate, thiophosphate, dithiophosphate, phosphate ester, thiophosphate ester, amide, siloxide, hydride, oxide, carbamate or hydrocarbon anion and which is devoid of halide anions. For purposes of this invention, a "substantial absence" of such compounds exists when such compounds are present in an amount of at most 0.1 moles per gram of the DMC catalyst complex, and preferably at most 0.001 moles per gram of the DMC catalyst complex. These amounts apply with respect to the combined amounts of all such magnesium, Group 3-Group 15 metal or lanthanide series metal compounds.

In the present invention, the mixture of ethylene oxide and 1,2-propylene oxide is polymerized in the presence of the DMC catalyst complex and the initiator compound. The polymerization is performed continuously. Such a continuous process includes a step a) in which initial concentrations of materials are established in the reactor and a step b) in which initiator, alkylene oxide mixture and catalyst are fed continuously to the reactor with continuous removal of a product stream.

The catalyst typically is activated prior to step b). Preferably, steady-state polymerization conditions are established prior to step b). The steady-state conditions include, for example, temperature and pressure, concentrations of initiator, alkylene oxide mixture, catalyst and polymerizate, all of which are constant during step b) to within the capability of the equipment. "Polymerizate" refers to polyethers formed in the alkoxylation of the initiator compound during steps a) and b), including all polyethers those having molecular weights greater than the initiator compound and up to and including that of the product.

In step b), the catalyst, alkylene oxide mixture and initiator are fed continuously to the continuous reactor under polymerization conditions. The catalyst, alkylene oxides and initiator can be fed separately, as a mixture, and/or in two or more sub-mixtures each of which contains any two or more thereof. A product stream is removed continuously from the continuous reactor. The feed rates of the feed(s) and withdrawal rates of the product stream are selected together to maintain steady-state conditions in the reactor (within the capabilities of the equipment), and to produce a product having a desired molecular weight.

The alkylene oxides may be fed to the reactor on demand by continuously pressurizing the reactor with the alkylene oxide mixture to a predetermined internal reactor pressure. Upon establishing steady-state operation, the concentration of unreacted alkylene oxide preferably is maintained at a level of from 0.01% to 10%, more preferably from 0.1% to 5% by weight, most preferably from 0.5 to 3% by weight or from 0.75 to 2%, based on the weight of the reactor contents.

The polymerization temperature is typically at least 80° C., preferably at least 120° C., and more preferably at least 140° C. The reaction temperature may be 200° C. or higher, but it is preferred that the temperature is up to 190° C., more preferably 180° C. or up to 165° C., to maintain workable reactor pressures, avoid forming a significant amount of volatile impurities or other by-products, and maintain adequate catalyst activity without deactivating or decomposing the DMC catalyst. The polymerization reaction usually is performed at superatmospheric pressures, but can be performed at atmospheric pressure or even subatmospheric pressures.

The polymerization reaction can be performed in any type of vessel that is suitable for the pressures and temperatures encountered. The vessel should have one or more inlets through which the various feeds can be introduced during the reaction and at least one outlet through which a product stream can be withdrawn. A tubular reactor that has multiple points for injecting the starting materials, a loop reactor, and a continuous stirred tank reactor (CTSR) are all suitable types of vessels for continuous operations. The reactor should be equipped with means of providing or removing heat, so the temperature of the reaction mixture can be maintained within the required range. Suitable means include various types of jacketing for thermal fluids, various types of internal or external heaters, and the like. A cookdown step performed on continuously withdrawn product is conveniently conducted in a reactor that prevents significant back-mixing into the reactor in which step b) is performed. Plug flow operation in a pipe or tubular reactor is a preferred manner of performing such a cook-down step.

The product polyether may contain up to 0.5% by weight, based on the total weight, of unreacted alkylene oxide; small quantities of the initiator compound and alkoxylates thereof that have molecular weights lower than the product; and small quantities of other organic impurities and water. Volatile impurities should be flashed or stripped from the polyether. The product typically contains catalyst residues. It is typical to leave these residues in the product, but these can be removed if desired. Moisture and volatiles can be removed by stripping the polyol.

The process of the invention is useful for preparing polyether products that can have hydroxyl equivalent weights from as low as 200 to as high as about 2000. The hydroxyl equivalent weight may be, for example, at least 225, at least 250 or at least 275, and may be, for example up to 2000, up to 1750, up to 1500, up to 1200, up to 1000, up to 750, up to 500, up to 400, or up to 350. All equivalent and molecular weights mentioned herein are number average weights by gel permeation chromatography unless otherwise indicated.

Polyethers made in accordance with this invention are useful as starting materials for making polyurethanes. Because they contain a large proportion of polymerized ethylene oxide, the polyethers are often somewhat hydrophilic and have high proportions of primary hydroxyl groups. They polyethers are particularly useful as starting materials for making viscoelastic polyurethane foam, and as cell openers for making slabstock and molded flexible conventional and/or high resiliency polyurethane foam. They are also useful as surfactants, and in water-absorbent applications such as sponges, diapers and incontinence products and the like.

The following examples are provided to illustrate the invention but are not intended to limit the scope thereof. All parts and percentages are by weight unless otherwise indicated.

Comparative Run A

A continuous polymerization is performed in a 500 mL Autoclave Engineers continuous stirred tank reactor equipped with a heated external recirculation loop and an internal cooling coil. The recirculation loop is driven by a gear pump for recirculating the reactor contents. The reactor is further equipped with a near-infrared analyzer flow cell and injection ports for initiator, catalyst slurry and alkylene oxides. The reactor has an exit port to allow the reactor contents to flow out of the reactor through a heated exit line into a sample collection system. The reactor pressure is controlled by a pressure control valve on the exit line.

A zinc hexacyanocobaltate catalyst complex is mixed with a 450 molecular weight polypropylene oxide) triol to form a catalyst slurry containing 1% by weight of the catalyst complex.

The reactor is charged with 205 g of a 450 molecular weight, glycerin-initiated polypropylene oxide) triol that contains 335 ppm of DMC catalyst and is acidified with 25 ppm of phosphoric acid. The mixture is heated to 130° C. for 90 minutes with a nitrogen sparge and continuous stirring to dry the reactor contents. The reactor is then heated to 160° C., the sparge is stopped, and the reactor is sealed. 141 g of 1,2-propylene oxide (PO) and 275 g of ethylene oxide (EO) are fed to the reaction mixture to activate the catalyst and alkoxylate the starting triol to a molecular weight of about 1000. Once the catalyst has activated, the feeds of ethylene oxide, propylene oxide, the DMC catalyst slurry and glycerin acidified with 75 ppm of phosphoric acid are started. The ethylene oxide/propylene oxide weight ratio is 66/34 by weight. Once the reactor reaches its liquid fill point, a product stream is withdrawn. The flow rates in and out of the reactor are adjusted to create a steady state concentration of DMC catalyst of 150 ppm and a residence time of 12 hours.

The concentration of unreacted alkylene oxides in the reactor is monitored as an indicator of catalyst activity. At the beginning of the glycerin feed, the concentration of unreacted oxides is about 2% as measured in real time by the near infrared analyzer. Thereafter, the concentration of unreacted oxides rises continuously over 10 hours to 6% due to the deactivation of the catalyst. The reactor automatically shuts down when the concentration of unreacted oxides reaches 6%, as a safety precaution. The 10 hours of operation corresponds to less than one reactor volume of product being formed. The final reactor product contains 142 ppm of the DMC catalyst.

EXAMPLE 1

Polyol A is a 168 hydroxyl number (333 equivalent weight, 1000 molecular weight), trifunctional random copolymer or propylene oxide and ethylene oxide. Polyol A contains 60% by weight oxyethylene units. 1 kg of Polyol A is charged into a 1 L Buchi reactor heated via an external jacket. The reactor is equipped with injection ports for introduction of reactants and a withdrawal port for removing a product stream. Pressure control is maintained via a pressure control valve on an exit line attached to the withdrawal port. A near infrared cell is set at the reactor outlet to measure unreacted oxide content in the product stream.

The reactor and Polyol A are heated to 160° C. At this temperature, (1) a catalyst slurry consisting of 0.1 wt-% a zinc hexacyanocobaltate catalyst complex in Polyol A is fed continuously to the reactor at a rate of 12 g/hour; (2) a propoxylated glycerin initiator having a molecular weight of 260 is fed continuously to the reactor at a rate of 75 g/hour and (3) a mixture of 80.5 wt-% ethylene oxide and 19.5 wt-% propylene oxide is fed continuously to the reactor at a rate of 223 g/hr. Once the reactor reaches its fill point, 310 g/hour of a product stream is withdrawn from the reactor. These feed and withdrawal rates produce a concentration of 40 ppm of DMC catalyst in the reactor and in the withdrawn product stream.

After operating at these conditions for 15 hours, product is collected during another 24 hours of operation until the experiment is arbitrarily discontinued. The level of unreacted oxides in the product stream remains at 1% during the entire reaction period, indicating that the DMC catalyst remains active throughout. The product has a hydroxyl number of 167 (336 equivalent weight, 1008 molecular weight) and contains 60% by weight oxyethylene units.

EXAMPLE 2

Example 1 is repeated, altering the flow rates as follows: (1) catalyst mixture in Polyol A—15.9 g/hr; propoxylated glycerin initiator having a molecular weight of 260 g/mol—38 g/hr; ethylene oxide/propylene oxide mixture—114 g/hr; product stream—167.9 g/hr. These flow rates produce a concentration of 95 ppm of the DMC catalyst in the reactor and in the product stream. These conditions are maintained for 15 hours, and for another 24 hours during which product is collected, after which the experiment is arbitrarily discontinued. Unreacted oxide content in the product stream is below 1% by weight during the entire run, again indicating no loss of DMC activity. The product has a hydroxyl number of 168 (333 equivalent weight, 1000 molecular weight) and contains 60% by weight oxyethylene units.

The product from Example 2 is used in a viscoelastic foam formulation as described in Table 1 following. The foam is made by mixing all components and immediately dispensing the resulting mixture into a box and allowing the foam to rise against atmospheric pressure. For comparison, an otherwise like foam formulation is made, replacing the product from Example 2 with Polyol A.

TABLE 1

| Ingredient | Parts by Weight | |
| --- | --- | --- |
| | Comp. A* | Inventive |
| Polyol A | 60 | 0 |
| Polyol of Example 2 | 0 | 60 |
| 1000 Molecular Weight triol | 20 | 20 |
| 3100 Molecular Weight EO/PO triol | 20 | 20 |
| Water | 2 | 2 |
| Silicone surfactant | 0.8 | 0.8 |
| 70% Bis(2-dimethylaminoethyl)ether) solution | 0.2 | 0.2 |
| 33% triethylenediamine solution | 0.05 | 0.05 |
| Stannous Octoate | 0.05 | 0.05 |
| Polymeric MDI | 47.86 (75 index) | 47.86 (75 index) |

The "blow-off" time is determined by observing the rising foam, and is calculated from the time the foam mixture is poured into the box. Airflow, compression set (90% compression, parallel), foam density, indentation force deflection, resilience, tensile strength and tear strength are measured according to ASTM D 3574-01, and viscoelastic recovery (load at 25%, 65% and 75% deflection, support factor and recovery time) are measured according to the BASF Compression Recovery test. Results are as indicated in Table 2.

TABLE 2

| Test | Comp. A. | Inventive |
| --- | --- | --- |
| Blow off time, s | 101 | 146 |
| Airflow, L/s (cubic feet/minute) | 1.9 (4.1) | 1.8 (3.8) |
| VE Recovery | | |
| Load @ 25% Deflection, N (lbf) | 11.6 (2.6) | 9.8 (2.2) |
| Load @ 65% Deflection (lbf) | 19.6 (4.4) | 20.9 (4.7) |
| Load @ 75% Deflection (lbf) | 30.2 (6.8) | 36.5 (8.2) |
| Support Factor (%) | 1.7 | 2.1 |
| CS 90%, % | 0.7 | 0.7 |
| Density, kg/m³ (pcf) | 49.6 (3.1) | 52.8 (3.3) |
| Indentation Force Deflection | | |
| Load @ 25%, N (lbf) | 56.0 (12.6) | 68.1 (15.3) |
| Load @ 65%, N (lbf) | 110.7 (24.9) | 139.7 (31.4) |
| Load @ 25%, N (lbf) | 52.0 (11.7) | 62.7 (14.1) |
| Support Factor, % | 2.0 | 2.1 |
| Hysteresis, % | 92.9 | 91.9 |
| Resiliency, % | 4 | 4 |
| Tear strength, N/m (lbf/in) | 175 (1.0) | 164 (0.94) |
| Tensile strength, kPa (psi) | 49.9 (7.1) | 61.4 (8.9) |
| Elongation at break, % | 103 | 94 |

What is claimed is:

1. A continuous process for producing a polyether product having a hydroxyl equivalent weight of 200 to 2000, comprising:

a) forming in a continuous reactor a mixture of a double metal cyanide catalyst, an alkylene oxide mixture containing propylene oxide and at least 60% by weight ethylene oxide based on the weight of the alkylene oxide, at least one alkoxylated initiator compound having at least one hydroxyl group, a hydroxyl equivalent weight of 70 to 200 but lower than that of the polyether product, and a polymerizate consisting of alkoxylated species having molecular weights greater than the initiator compound and up to and including molecular weight of the polyether product, and b) continuously adding more of the double metal cyanide catalyst, additional alkylene oxide mixture containing propylene oxide and at least 60% by weight ethylene oxide based on the weight of the alkylene oxide, and more of the alkoxylated initiator compound having at least one hydroxyl group, a hydroxyl equivalent weight of 70 to 200 but lower than that of the polyether product to the continuous reactor under polymerization conditions and continuously withdrawing a product stream containing the polyether product from the continuous reactor, wherein:

i) steps a) and b) are performed in the absence of a magnesium, Group 3-Group 15 metal or lanthanide series metal bonded to at least one alkoxide, aryloxy, carboxylate, acyl, pyrophosphate, phosphate, thiophosphate, dithiophosphate, phosphate ester, thiophosphate ester, amide, siloxide, hydride, oxide, carbamate or hydrocarbon anion, aid which magnesium, Group 3-Group 15 metal or lanthanide series metal bonded to at least one alkoxide, aryloxy, carboxylate, acyl, pyrophosphate, phosphate, thiophosphate, dithiophosphate, phosphate ester, thiophosphate ester, amide, siloxide, hydride, oxide, carbamate or hydrocarbon anion is devoid of halide anions, and ii) the polyether product contains 50 to 90% by weight polymerized ethylene oxide.

2. The continuous process of claim 1, wherein prior to step b), steady-state concentrations of the double metal cyanide catalyst, the alkylene oxide mixture and the initiator compound are established in the continuous reactor under polymerization conditions, and such steady-state concentrations are maintained during step b).

3. The method of claim 2, wherein the initiator compound has a hydroxyl equivalent weight of 70 to 150.

4. The method of claim 3 wherein the initiator compound is a 70 to 150 equivalent weight alkoxylate of one or more of ethylene glycol, diethylene glycol, triethylene glycol, propylene glycol, dipropylene glycol, tripropylene glycol, glycerin, trimethylolpropane, pentaerythritol, sucrose and sorbitol.

5. The method of claim 4 wherein the initiator compound is a 70 to 125 equivalent weight propoxylate of glycerin or trimethylolpropane.

6. The method of claim 3, wherein the polyether product has a hydroxyl equivalent weight of 200 to 1750.

7. The method of claim 3, wherein the polyether product has a hydroxyl equivalent weight of 200 to 700.

8. The method of claim 3, wherein the polyether product has a hydroxyl equivalent weight of 275 to 400.

9. The method of claim 3, wherein the alkylene oxide mixtures in steps a) and b) contain 65 to 90% by weight ethylene oxide and correspondingly 35 to 10% by weight propylene oxide.

10. The method of claim 9, wherein the alkylene oxide mixtures in steps a) and b) contain 70 to 85% by weight ethylene oxide and correspondingly 30 to 15% by weight propylene oxide.

11. The method of claim 10, wherein the alkylene oxide mixtures in steps a) and b) contain 75 to 85% by weight ethylene oxide and correspondingly 25 to 15% by weight propylene oxide.

12. The method of claim 3, wherein the double metal cyanide catalyst is a zinc hexacyanocobaltate catalyst complex.

13. The method of claim 1, wherein the amount of double metal cyanide catalyst is present in step b) at a concentration of 25 to 100 ppm by weight.

\* \* \* \* \*